3,256,332
METHOD FOR THE PRODUCTION OF 5(3'-AMINO-
PROPYLIDENE) DIBENZO[a,d]CYCLOHEPTA[1,4]
DIENES
Niels Lassen, Copenhagen, Denmark, assignor to Kefalas
A/S, Copenhagen-Valby, Denmark
No Drawing. Filed Mar. 19, 1963, Ser. No. 266,221
Claims priority, application Great Britain, Mar. 23, 1962,
11,198/62; Nov. 9, 1962, 42,377/62
3 Claims. (Cl. 260—570.8)

The present invention relates to the production of dibenzo [a,d] cyclohepta [1,4] dienes of the formula:

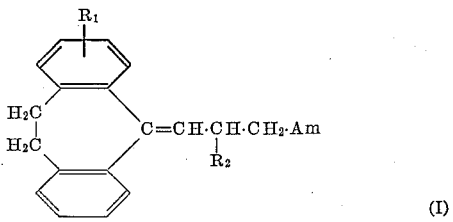

wherein $R_1$ represents hydrogen, halogen, e.g., chloro, bromo or fluoro, or a lower alkyl group, $R_2$ represents hydrogen or a methyl group and Am represents a secondary or tertiary amino group, as well as non-toxic acid addition salts thereof.

The compounds of Formula I and the acid addition salts thereof are useful therapeutics and possess valuble pharmacodynamic properties, which make them particularly useful as anti-depressants in the treatment of psychotic patients. Thus it has been shown that the compounds of Formula I distinguish themselves in the treatment of patients suffering from depressions, especially of an endogenic nature.

Some of the compounds of Formula I wherein Am represents a tertiary amino group have previously been described, for example, in British patent specification No. 858,187.

When the compounds of Formula I are asymmetrically substituted in the phenyl rings, they may exist as two geometric isomers of the cis-trans type, which isomers although similar are not identical with respect to their pharmacodynamic properties. The isomers may be separated according to procedure conventional in the art.

The compounds of Formula I and the acid addition salts thereof may be administered both orally and parenterally, for example in the form of tablets, capsules, powders, syrups or solutions for injection.

The process provided by the present invention distinguishes itself in that on the one hand it makes possible the preparation of such valuable compounds of Formula I which are not accessible according to known methods, and on the other hand it provides some of the known compounds of Formula I in better yields and a higher degree of purity.

In the foregoing Formula I and elsewhere herein, the term lower-alkyl refers to an alkyl radical containing up to and including eight carbon atoms, and preferably no more than three carbon atoms, which may have either straight or branched chain structure, for example, methyl, ethyl, propyl, isopropyl, butyl, isobutyl, amyl, hexyl, heptyl, octyl, or the like.

The process provided by the present invention consists essentially in the production of an amine substituted compound of Formula I, or an acid addition salt thereof by a process which comprises mixing and reacting a compound of the formula:

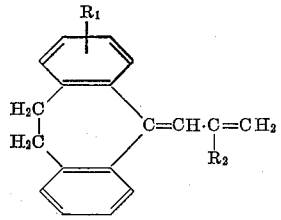

wherein $R_1$ and $R_2$ are as defined above with an amine AmH, wherein Am is as defined above in the presence of a metal amide, metal or metalorganic compound which are able to form a metalamide with the amine present in the reaction mixture as a catalyst, and isolating the compound of Formula I in the form of the free base or an acid addition salt thereof.

The compounds of Formula II, which are hitherto unknown, may conveniently be prepared from dibenzo [a,d] cyclohepta [1,4] diene-5-on or its derivatives respectively by reacting with an allyl- or methallylmagnesium halide, hydrolzing the complex formed and dehydrating the resulting carbinol to yield the compound of Formula II.

The amine, AmH, is according to the method of the invention preferably present in excess so as to constitute at the same time a solvent for the reactants, but another inert organic solvent may as well be present. The metal is preferably selected from the alkalimetals, especially sodium and lithium. When using a metalamide it has proved particular suitable to use sodamide. As metalorganic compound it has been found especially suitable to use a Grignard compound such as an alkyl- or aryl magnesium halide, for example ethyl magnesium bromide or phenyl magnesium bromide, but also other metalorganic compounds such as butyllithium, phenyllithium or the like have been found convenient.

The amount of catalyst used varies considerably partly depending upon the kind of catalyst used and the conditions of the reaction, but the mole fraction of catalyst to the compound of Formula II may suitably be from about 0.1 to 5 although higher proportions may be used.

It has been found convenient to conduct the reaction at an elevated temperature preferably above 50 degrees centigrade in order to secure a reasonable time of reaction. When employing a higher boiling amine (AmH) the reaction may suitably be carried out about the boiling point of the amine. When using rather volatile amines such as methylamine or dimethylamine it has been found suitable to carry out the reaction in an autoclave under pressure and preferably at a temperature of 100 degrees centigrade or higher.

The mechanism of the reaction is not fully elucidated, but it is presumed that it proceeds via a metalamide corresponding to the amine reactant (AmH). When a metal is used as catalyst it may be presumed that the metal first reacts with the amine to form an amide. When using another metalamide or an organic metal compound the metal compound in question in all probability first reacts with the amine to form an amide.

As representative examples of heterocyclic amines of the formula AmH may be mentioned pyrrolidine, piperidine, morpholine, thiamorpholine, piperazine, N'-lower-alkylpiperazine, N'-hydroxy-lower-alkylpiperazine and C-methyl derivatives of the foregoing heterocyclic amines.

The N'-hydroxy-lower-alkylpiperazine radicals may be represented by the partial formula: >N-lower-alkylene-OH, wherein the lower-alkylene radical is straight or branched and is a lower-alkyl radical minus one hydrogen atom and the hydroxy group may be primary, secondary or tertiary.

For obvious reasons, when isolating any of the compounds of Formula I in the form of an acid addition salt, the acid is preferably selected so as to contain an anion which is non-toxic and pharmacologically acceptable at least in usual therapeutic doses. Representative acid addition salts are hydrochlorides, hydrobromides, sulphates, phosphates, nitrates, acetates, lactates, maleates, citrates, tartrates and bitartrates, succiantes, oxalates, methanesulphonates and ethanesulphonates. Other acid addition acid salts are likewise suitable and may be employed if desired. For example, fumaric, benzoic, salicylic, bis-methylenesalicylic, propionic, gluconic, malic, malonic, mandelic, cinnamic, citraconic, stearic, palmitic, itaconic, glycolic, benzene-sulphonic, and other sulphonic acids may also be employed as acid addition salt-forming acids. While it is preferred to isolate the products from the process of the invention in the form of a solid or crystalline acid addition salt, if for any reason it is desired to obtain one of these amines in the form of its free base, this is ordinarily done according to conventional procedure, for example by conducting the amination reaction in a solvent and thereafter evaporating the solvent to obtain the reaction product as a residue, usually an oil, or by dissolving the isolated hydrochloride or other salt in water, treating with a base such as aqueous ammonia, sodium carbonate or other suitable alkaline material, extracting the liberated base with a suitable solvent such as benzene, drying the extract, and evaporating to dryness in vacuo or fractionally distilling.

When Am— represents a piperazine radical, and it is desired to subsequently treat with an alkylating agent this is done according to conventional procedure by treating with for example methanolic formaldehyde in formic acid according to the classic Eschweiler-Clarke procedure, or a reactive alkyl or substituted alkyl ester, especially a hydroxyalkyl ester, for example alkyl or substituted akyl halides, e.g., bromides or iodides, alkyl or substituted alkyl sulfates or sulfonates of the sodium or potassium alkyl sulfate or sulfonate type or of the dialkyl sulfate type, and the like.

The following examples are given to illustrate the process and products of the present invention, but they are to be understood as exemplary only and are not to be construed as limiting.

*Example 1.—5-(3'-dimethylaminopropylidene)-dibenzo [a,d]cyclohepta [1,4]diene and its hydrochloride*

(a) To a solution of allylmagnesium bromide in 2.5 liters of ether, prepared from 363 grams (3 mole) of allylbromide, are added 416 grams (2 mole) of dibenzo[a,d] cycloheptal[1,4]diene-5-on and the reaction mixture is left standing for half an hour, when it is poured into finely crushed ice and glacial acetic acid is added until the magnesium hydroxide has gone into solution. The ether phase is separated, washed with dilute aqueous ammonia unto basic reaction, dried over anhydrous potassium carbonate, filtered and evaporated on a steam bath. The residue which is a light yellow oil is dissolved in 1.5 liters of petroleum ether and cooled to −10 degrees centigrade. When standing for some time 5-alkyl-dibenzo[a,d]-cyclohepta[1,4]diene-5-ol crystallizes as colourless crystals which is filtered off and washed on the filter with a little petroleumether. By further evaporation of the mother liquor the total yield is raised to 465 grams (93%) of a colourless crystalline substance melting at 40–42 degrees centigrade.

(b) 100 grams of this substance are dissolved in a mixture of 50 milliliters of benzene and 40 milliliters of acetic anhydride and heated to 85 degrees centigrade. 2½ milliliters of acetylchloride are added and after 1–5 minutes a reaction takes place which raises the temperature to about 110 degrees centigrade. After the reaction has subsided the mixture is cooled, dissolved in ether and washed with dilute aqueous ammonia unto basic reaction. The ether phase is separated, dried over anhydrous potassium carbonate and evaporated on a steam bath finally in vacuo. The residue which mainly consists of 5-(propen-3'-yliden-1')-dibenzo[a,d]cyclohepta[1,4]diene is an almost colourless oil. This oil is used directly in the next step without further purification. By dissolving the oil in 500 milliliters of absolute ethanol and cooling, colourless crystals melting at 59–60 degrees centigrade are obtained.

(c) To the unpurified 5-(propen-3'-yliden-1')-dibenzo[a,d]cyclohepta[1,4]diene from the preceding paragraph is added a solution of phenylmagnesium bromide in ether prepared from 85 grams (0.6 mole) of bromobenzene, whereupon the ether is evaporated in vacuo. The residue is poured into an autoclave and 300 milliliters of anhydrous dimethylamine are added while stirring and cooling. The autoclave is closed and heated to 110 degrees centigrade for eighteen hours. After cooling the autoclave is opened, excess dimethylamine is removed by evaporation, the residue is poured unto finely crushed ice and glacial acetic acid added until the magnesium hydroxide has been dissolved, whereupon the acid solution is washed with ether. The etherlayer is extracted once with dilute acetic acid, whereupon the combined acid solutions are made alkaline with dilute aqueous ammonia. Hereby separates 5 - (3'-dimethylaminopropylidene) - dibenzo[a,d]cyclohepta [1,4]-diene as a light yellow oil. The oil is extracted with ether, the ether phase dried over anhydrous potassium carbonate, treated with decolourizing carbon and evaporated on a steam bath. The residue is dissolved in 500 milliliters of acetone and the solution neutralized to pH 5 with a concentrated solution of dry hydrogenchloride in ether. Upon standing and cooling the hydrochloride of 5 - (3'-dimethylaminopropylidene) - dibenzo [a,d]cyclohepta[1,4]-diene is obtained as colourless crystals which are filtered off and washed on the filter with a little acetone. Yield 107 grams (85%) of the hydrochloride melting at 197–198 degrees centigrade.

*Example 2.—5-(3'-methylaminopropylidene)-dibenzo [a,d]cyclohepta[1,4]diene and its hydrochloride*

When Example 1 is carried out starting with the unpurified 5-(propen-3'-yliden-1')-dibenzo[a,d]cyclohepta [1,4]diene, 1 mole of phenylmagnesium bromide and 300 milliliters of anhydrous methylamine instead of dimethylamine the hydrochloride of 5-(3'-methylaminopropylidene)-dibenzo[a,d]cyclohepta[1,4]diene is obtained in a yield of 75% and melting at 216–218 degrees centigrade.

*Example 3.—5-(3'-methylaminopropylidene)-dibenzo [a,d]cyclohepta[1,4]diene and its hydrochloride*

300 milliliters of anhydrous methylamine and eight grams of lithium are heated in an autoclave at 120 degrees centigrade for 4 hours resulting in a dissolution of the metal in the amine. The solution is cooled and the autoclave opened and 5-(propen-3'-yliden-1')-dibenzo [a,d]cyclohepta[1,4]diene prepared from 100 grams of 5-allyl-dibenzo[a,d]cyclohepta[1,4]diene-5-ol is added while cooling and stirring. The autoclave is closed and heated to 110 degrees centigrade for 44 hours. After cooling the 5-(3'-methylaminopropylidene)-dibenzo[a,d] cyclohepta[1,4]diene formed by the reaction is isolated as described in Example 1 (c). The base is dissolved in 400 milliliters of absolute ethanol and neutralized to pH 5 with a solution of dry hydrogen chloride in ether. When cooling 49 grams (41%) of the hydrochloride 5-(3'-methylaminopropylidene) - dibenzo[a,d]cyclohepta[1,4] diene is obtained as colourless crystals melting at 216–218 degrees centigrade.

*Example 4.—5-(3'-N-pyrrolidinyl-propylidene)-dibenzo [a,d]cyclohepta[1,4]diene and its hydrochloride*

To 5 - (propen - 3' - ylidene - 1') - dibenzo[a,d]cyclohepta[1,4]diene prepared from 10 grams of 5-allyl-dibenzo[a,d]cyclohepta[1,4]diene-5-ol is added a solution of phenyllithium in ether prepared from 8 grams of bromobenzene, the ether is evaporated in vacuo and 40 milliliters of anhydrous pyrrolidine are added, whereupon the mixture is boiled on a steam bath in an atmosphere of nitrogen with reflux for 40 hours. Thereafter excess of pyrrolidine is evaporated in vacuo and from the residue are obtained as described in Example 1 (c) 4.5 grams (34%) of the hydrochloride of 5-(3'-N-pyrrolidinyl-propylidene)-dibenzo[a,d]cyclohepta[1,4]-diene as colourless crystals which after recrystallization from acetone melts at 226–228 degrees centigrade.

*Example 5.—5 - (3' - N - (N' - methyl) - piperazinylpropylidene) - dibenzo[a,d]cyclohepta[1,4]diene and its dihydrochloride*

To 5 - (propen - 3' - ylidene - 1') - dibenzo[a,d]cyclohepta[1,4]diene prepared from 20 grams of 5-allyl-dibenzo[a,d]cyclohepta[1,4]diene-5-ol are added 60 milliliters of N-methylpiperazine and 2 grams of sodamide whereupon the mixture is heated to 110 degrees centigrated for 18 hours. Excess of methylpiperazine is evaporated in vacuo and 5-(3'-(N-methyl)piperazinylpropylidene) - dibenzo[a,d]cyclohepta[1,4]diene isolated as described in Example 1 (c), as a yellow oil which is dissolved in 25 milliliters of acetone and neutralized to pH 3 with dry hydrogenchloride in ether. Thereby 24.8 grams (64%) of the dihydrochloride is obtained as a crystalline substance which after recrystallization from ethanol melts at 249–253 degrees centigrade.

*Example 6.—5-(3'-N-piperazinylpropylidene)-dibenzo [a,d]-cyclohepta[1,4]diene and its dimaleate*

When Example 5 is carried out using 60 grams of anhydrous piperazine instead of N-methylpiperazine 5-(3'-N-piperazinyl - propylidene) - dibenzo[a,d]cyclohepta[1,4]diene is obtained. When dissolving this base in 100 milliliters of absolute ethanol and neutralizing the solution to pH 4 with a solution of maleic acid in absolute ethanol 32.5 grams (61%) of the dimaleate are obtained as a white crystalline substance melting at 166–168 degrees centigrade.

*Example 7.—5 - (3' - N - (N - β - hydroxyethyl) - piperazinylpropylidene) - dibenzo[a,d]cyclohepta[1,4]diene and its dihydrochloride*

Three grams of 5-(3'-N-piperazinylpropylidene)-dibenzo[a,d]cyclohepta[1,4]diene are dissolved in ten milliliters of methanol, 0.7 milliliter of ethyleneoxide is added, and the mixture is left standing for five hours at room temperature. Thereafter the solvent is evaporated in vacuo, the residue is dissolved in ether and the ethereal solution extracted with dilute acetic acid. The acetic acid solution is made alkaline with dilute aqueous ammonia, and the base which separates is extracted with ether. The ether phase is dried and evaporated on a steam bath, the residue dissolved in fifty milliliters of absolute ethanol and the solution neutralized to pH 3 with dry hydrogen chloride in ether, resulting in the crystallization of 3.1 grams of the dihydrochloride of 5-(3'-N-(N'-β-hydroxyethyl)piperazinylpropylidene) - dibenzo[a,d]cyclohepta[1,4]diene melting at 257–259 degrees centigrade and being only silghtly soluble in ethanol.

*Example 8.—5 - (3' - N - piperidylpropylidene) - dibenzo [a,d]cyclohepta[1,4]diene and its hydrochloride*

When Example 5 is carried out using 60 milliliters of anhydrous piperidine instead of N-methylpiperazine 18.7 grams (55%) of the hydrochloride of 5-(3'-N-piperidylpropylidene)-dibenzo[a,d]cyclohepta[1,4]diene are obtained melting at 223–224 degrees centigrade after recrystallization from absolute ethanol.

*Example 9.—Other 5-(3'-secondary amino or tertiary aminopropylidene) - dibenzo[a,d]cyclohepta[1,4]dienes and their hydrochlorides*

When Example 1 is carried out starting with the unpurified 5 - (propen - 3' - yliden - 1') - dibenzo[a,d]cyclohepta[1,4]diene and the corresponding amount of dibenzylamine, benzylamine, methylbenzylamine, ethanolamine, ethylamine, isopropylamine, diethylamine, morpholine, methyl - phenyl - 2 - isopropylamine, 4 - diethylamino-1 - methyl - n - butylamine, methylcyclopentylamine, N-(3' - methylbenzyl) - piperazine respectively instead of dimethylamine, the hydrochlorides of 5-(3'-dibenzylaminopropylidene-dibenzo[a,d]cyclohepta [1,4]diene (M.P. 239–240 degrees centigrade),
5-(3'-benzylaminopropylidene)-dibenzo[a,d]cyclohepta [1,4]diene (M.P. 175–177 degrees centigrade),
5-(3'-methylbenzylaminopropylidene)-dibenzo[a,d] cycloheptal[1,4]diene (M.P. 215–127 degrees centigrade),
5-(3'-hydroxyethylaminopropylidene)-dibenzo[a,d] cyclohepta[1,4]diene (M.P. 212–213 degrees centigrade),
5-(3'-ethylaminopropylidene)-dibenzo[a,d]cyclohepta [1,4]diene (M.P. 262–264 degrees centigrade),
5-(3'-isopropylaminopropylidene)-dibenzo[a,d] cyclohepta[1,4]diene (M.P. 239–241 degrees centigrade),
5-(3'-diethylaminopropylidene)-dibenzo[a,d]cyclohepta [1,4]diene (M.P. 168–169 degrees centigrade),
5-(3'-morpholinopropylidene)-dibenzo[a,d]cyclohepta [1,4]diene (M.P. 233–234 degrees centigrade),
5-[3'-N-methyl-N-(3"-phenylpropyl-2")-aminopropylidene]-dibenzol[a,d]cyclohepta[1,4]diene (M.P. 159–161 degrees centigrade),
5[3'-(4"-diethylamino-1"-methyl-butylamino)-propylidene]-dibenzo[a,d]cyclohepta[1,4]diene (M.P. 221–222 degrees centigrade),
5-(3'-methyl-cyclopentylaminopropylidene) dibenzo [a,d]cyclohepta[1,4]diene (M.P. 218–219 degrees centigrade), and
5-[3'-(4"-[3'''-methylbenzyl] piperazinyl-1")-propylidene]-dibenzo[a,d]cyclohepta[1,4]diene (M.P. 256–258 degrees centigrade)

are obtained.

*Example 10.—3 - chloro - 5 - (3'dimethylaminopropylidene)-dibenzo[a,d]cyclohepta[1,4]diene and its hydrochloride*

When Example 1 is carried out using 3-chloro-dibenzo-[a,d]cyclohepta[1,4]diene-5-on instead of dibenzo[a,d]-cyclohepta[1,4]diene-5-on the hydrochloride of 3-chloro-5 - (3' - dimethylaminopropylidene)-dibenzo[a,d]cyclohepta[1,4]diene is obtained melting at 210–212 degrees centigrade after recrystallization from ethanol/ether.

*Example 11.—3-chloro-5-(3'-methyl-benzylaminopropylidene)-dibenzo[a,d]cyclohepta[1,4]diene and 3-chloro-5 - (3' - methylaminopropylidene)-dibenzo[a,d]-cyclohepta[1,4]diene and their hydrochlorides*

When Example 3 is carried out using methyl-benzylamine and methylamine respectively instead of dimethylamine the hydrochlorides of 3-chloro-5-(3'-methyl-benzylaminopropylidene) - dibenzo[a,d]cyclohepta[1,4]diene (M.P. 231–233 degrees centigrade) and 3-chloro-5-(3'-methylaminopropylidene) - dibenzo[a,d]cyclohepta[1,4]-diene (M.P. 260–262 degrees centigrade) respectively are obtained.

*Example 12.—3 - methyl - 5 - (3'-dimethylaminopropylidene)-dibenzo[a,d]cyclohepta[1,4]diene and its hydrochloride*

When Example 1 is carried out using 3-methyl-dibenzo-[a,d]cyclohepta[1,4]diene-5-on instead of dibenzo[a,d]cyclohepta[1,4]diene-5-on the hydrochloride of 3-methyl-5 - (3' - dimethylaminopropylidene) - dibenzo[a,d]cyclohepta[1,4]diene is obtained melting at 220–221 degrees centigrade after recrystallization from ethanol/ether.

*Example 13.—3 - methyl-5-(3'morpholinopropylidene)-dibenzo[a,d]cyclohepta[1,4]diene and its hydrochloride*

When Example 5 is carried out using morpholine instead of dimethylamine the hydrochloride of 3-methyl-5 - (3' - morpholinopropylidene) - dibenzo[a,d]cyclohepta[1,4]diene melting at 230–240 degrees centigrade after recrystallization from ethanol/ether is obtained.

*Example 14.—5-(2'-methyl - 3' - dimethylaminopropylidene)-dibenzo[a,d]cyclohepta[1,4]diene and its hydrochloride*

When Example 1 is carried out using methallylbromide instead of allylbromide the hydrochloride of 5-(2'-methyl - 3' - dimethylaminopropylidene) - dibenzo[a,d]cyclohepta[1,4]diene melting at 214–215 degrees centigrade after recrystallization from ethanol/ether is obtained.

*Example 15.—5-(2'-methyl-3'-methylaminopropylidene)-dibenzo[a,d]cyclohepta[1,4]diene and its hydrochloride*

When Example 7 is carried out using methylamine instead of dimethylamine the hydrochloride of 5-(2'-methyl - 3' - methylaminopropylidene) - dibenzo[a,d]cyclohepta[1,4]diene melting at 195–196 degrees centigrade after recrystallization from ethanol/ether is obtained.

What I claim is:
1. Method of producing dibenzo[a,d]cyclohepta[1,4]-dienes selected from the group consisting of (1) bases having the structural formula:

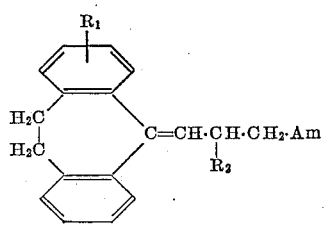

(I)

wherein $R_1$ is selected from the group consisting of hydrogen, halogen and a lower-alkyl group, $R_2$ is selected from the group consisting of hydrogen and a methyl group and Am is selected from the group consisting of lower-alkylamino, dilower-alkylamino, dibenzylamino, benzylamino, methylbenzylamino, pyrrolidino, piperidino, morpholino, thiamorpholino, piperazino, and N'-lower-alkylpiperazino, and (2) non-toxic pharmaceutically acceptable acid addition salts thereof, comprising the steps of mixing and reacting together a compound of the formula:

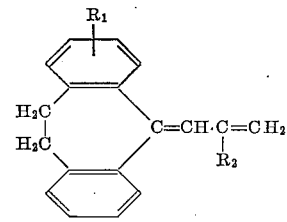

(II)

wherein $R_1$ and $R_2$ are as defined above with an amine AmH, wherein Am is as defined above in the presence of a compound selected from the group consisting of an alkalimetalamide, an alkali metal, an alkyl magnesium halide, an aryl magnesium halide, butyllithium, and phenyllithium, to produce the desired dibenzo[a,d]cyclohepta[1,4]diene.

2. Method according to claim 1, comprising carrying out the reaction at a temperature of at least 50 degrees centigrade.

3. Method according to claim 1, wherein the amine AmH reactant is selected from the group consisting of methylamine and dimethylamine.

References Cited by the Examiner

UNITED STATES PATENTS 2,449,644  9/1948  Danforth _____ 260—577
2,984,687  5/1961  Esmay et al. _____ 260—577
3,073,847  1/1963  Doebel et al. ____ 260—570.5 X

FOREIGN PATENTS 215,424  6/1961  Australia.

CHARLES B. PARKER, *Primary Examiner.*
ROBERT V. HINES, *Assistant Examiner.*